US011283842B2

(12) United States Patent
Doree et al.

(10) Patent No.: US 11,283,842 B2
(45) Date of Patent: Mar. 22, 2022

(54) METHOD FOR CONTROLLING A COMMUNICATION COMPRISING MULTIPLE TRANSACTIONS

(71) Applicant: Orange, Paris (FR)

(72) Inventors: José Doree, Châtillon (FR); Jean-Claude Le Rouzic, Châtillon (FR)

(73) Assignee: ORANGE, Paris (FR)

(*) Notice: Subject to any disclaimer, the term of this patent is extended or adjusted under 35 U.S.C. 154(b) by 47 days.

(21) Appl. No.: 16/615,764

(22) PCT Filed: May 18, 2018

(86) PCT No.: PCT/FR2018/051209
§ 371 (c)(1),
(2) Date: Nov. 21, 2019

(87) PCT Pub. No.: WO2018/215719
PCT Pub. Date: Nov. 29, 2018

(65) Prior Publication Data
US 2020/0162518 A1 May 21, 2020

(30) Foreign Application Priority Data

May 23, 2017 (FR) ...................................... 1754569

(51) Int. Cl.
*H04L 29/06* (2006.01)
*H04L 65/10* (2022.01)
(Continued)

(52) U.S. Cl.
CPC ...... *H04L 65/1006* (2013.01); *H04L 43/0864* (2013.01); *H04L 65/1016* (2013.01); *H04L 65/1069* (2013.01)

(58) Field of Classification Search
CPC ............. H04L 65/1006; H04L 65/1069; H04L 43/0864; H04L 65/1016; H04L 65/1073; H04L 69/28
(Continued)

(56) References Cited

U.S. PATENT DOCUMENTS

| | | | | |
|---|---|---|---|---|
| 2003/0212912 | A1* | 11/2003 | Bajko | .............. H04L 63/20 726/14 |
| 2008/0062863 | A1* | 3/2008 | Ginde | .............. H04L 69/40 370/221 |
| 2008/0117816 | A1* | 5/2008 | Stone | ............ H04L 43/0817 370/230.1 |

FOREIGN PATENT DOCUMENTS

WO    WO 2016/185118    11/2016

OTHER PUBLICATIONS

Camarillo, et al., RFC 3312 Integration of Resource Management and SIP, Internet Engineering Task Force, Oct. 2002, pp. 1-24.
(Continued)

*Primary Examiner* — Glenford J Madamba
(74) *Attorney, Agent, or Firm* — Knobbe, Martens, Olson & Bear, LLP

(57) ABSTRACT

A method is described, the method relating to control of a communication between a first device and a second device using a communication protocol including at least a first transaction, and at least one subsequent second transaction. The method can include transmission, by the first device to the second device during the first transaction, of both a maximum acceptable delay between the end of the first transaction and the beginning of the second transaction, as well as an explicit indication of the type of message characterizing the beginning of the second transaction. The second device can then trigger a timer for the delay. The method is applicable to IMS networks.

12 Claims, 5 Drawing Sheets

Figure 1:
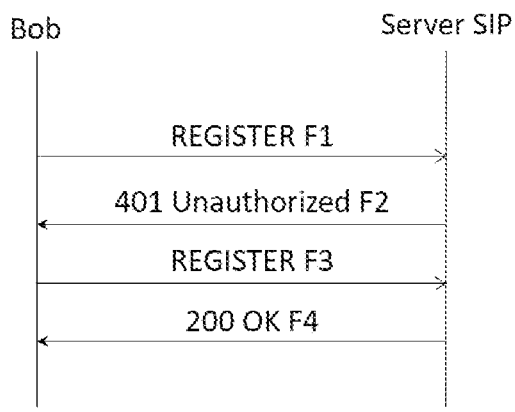

(51) Int. Cl.
*H04L 43/0864* (2022.01)
*H04L 65/1016* (2022.01)
*H04L 65/1069* (2022.01)

(58) Field of Classification Search
USPC .......................................................... 370/329
See application file for complete search history.

(56) References Cited

OTHER PUBLICATIONS

Rosenberg, et al., RFC 3261 SIP: Session Initiation Protocol, Internet Engineering Task Force, Jun. 2002, pp. 1-269.
International Search Report and Written Opinion dated Sep. 3, 2018 for Application No. PCT/FR2018/051209.
Roach A B: "RFC 3265: Session Initiation 1-12 Protocol (SIP)—Specific Event Notification", Network Working Group Request for Comments, (2002), pp. 1-38.

* cited by examiner

METHOD FOR CONTROLLING A COMMUNICATION COMPRISING MULTIPLE TRANSACTIONS

RELATED APPLICATIONS

This application is the U.S. National Phase of Application No. PCT/FR2018/051209 entitled "METHOD FOR CONTROLLING A COMMUNICATION COMPRISING MULTIPLE TRANSACTIONS" and filed May 18, 2018, which claims the benefit of French Patent Application No. 1754569, filed May 23, 2017, each of which is incorporated by reference in its entirety.

The present invention relates to IP ("Internet Protocol") communication networks, particularly to those IP networks that are able to implement advanced session control protocols. IP networks allow the delivery of conversational data within the framework of services such as "Voice over IP" (VoIP), "Content Sharing" or "Instant Messaging".

More specifically, the present invention relates to the means set up in an IP network for applying a timeout to a set of transactions between two client devices, or between a client device and a server, or else between two servers when these transactions are logically connected to one another.

These "client devices" may be, for example, a fixed or mobile terminal, or a gateway which may be either a residential gateway or one located in a business. For the sake of conciseness, the generic term "user terminal" or simply "terminal" will often be used below to refer to these various equipments.

Conventional advanced session control protocols, such as the SIP protocol (acronym for "Session Initiation Protocol"), use what are known as "signaling" messages, which are messages enabling a terminal to request a connection to another terminal, or else messages signaling that a telephone line is busy or signaling that the telephone which has been called is ringing or else signaling that a particular telephone is connected to the network and can be reached in a particular manner.

The SIP protocol was defined by the IETF (Internet Engineering Task Force) in the document RFC 3261. This protocol enables multimedia sessions to be established, modified and terminated in a network using the IP protocol. The SIP protocol was later extended, notably in the document RFC 3265. This extension defines event notification procedures.

The SIP protocol is used in particular in IMS (acronym for "IP Multimedia Subsystem") infrastructures. The IMS has been defined by the standards organization 3GPP ("Third Generation Partnership Project") and TISPAN ("Telecommunications and Internet Converged Services and Protocols for Advanced Networking"). It is a network architecture introduced by 3GPP for mobile networks and then adopted by TISPAN for fixed networks. This architecture makes it possible to dynamically establish and to control multimedia sessions between two clients, and also to reserve resources at the level of the transport network for transporting the multimedia streams. By virtue of this architecture, network operators are able to conveniently implement a management policy, provide a predetermined Quality of Service, and calculate bills to be invoiced to clients. The IMS currently enables access to telephony, videotelephony, and Presence and Instant Messaging services, and also manages the interaction with respect to these services.

Thus, when a user wishes to make use of the services offered by an IMS network, said user sends the network signaling messages that may in particular include various types of requests.

First of all, the user's client device has to register on the network, save in exceptional cases (such as some emergency calls). When the network is unable to associate this registration with a previous registration (for example following a network failure or following a shutdown of the client device for longer than a predetermined amount of time), the registration is considered to be an initial registration. After an initial registration, the user's client device has to periodically send the network a request to confirm that the user wishes to maintain his or her registration.

For the purpose of registering client devices, IMS networks comprise one or more registration servers, known as "S-CSCF" (acronym for "Serving-Call Server Control Function") servers, which are able (among other functions) to manage the registration procedure for the devices connected to the network.

IMS networks furthermore comprise one or more interrogation servers, known as "I-CSCF" (acronym for "Interrogating-Call Server Control Function") servers, which are often, in fact, physically combined with the S-CSCF registration servers to form call servers referred to as "I/S-CSCF" servers and which, at the time at which a client device is registered, interrogate a subscriber data server known as the "HSS" (acronym for "Home Subscriber Server") server for the purpose of selecting an S-CSCF server that has the features required on a mandatory (and, possibly, an optional) basis to achieve the level of service subscribed to by the user. The HSS servers each contain a client database, and are therefore the equivalent in IP networks of the HLR (acronym for "Home Location Register") servers used in GSM networks. Each HSS server contains the "profile" of a certain number of client devices of the network, this profile comprising their registration state, authentication and location data, and the services to which it is entitled.

Indeed, after being assigned an S-CSCF server in this way, each user can make use of a certain number of services during the session in progress. These may, for example, be services offered automatically to all the users of the IMS network. These may also be services to which this user has subscribed with the network operator, and which are automatically made available to said user. Finally, these may be services which the user can make use of after having sent an appropriate request (SIP SUBSCRIBE).

These services comprise audiovisual applications such as are mentioned above. The subscription may also be a subscription to the state of a network resource, in which case event notifications (SIP NOTIFY) are sent to the client device as soon as the state of the resource changes; for example, when the user of a client device has a voicemail box on the network, said user can be informed every time a message has been recorded in this voicemail box; likewise, a user can request to be notified of the registration state of his or her own client device.

IMS networks furthermore comprise one or more servers known as "P-CSCF" (acronym for "Proxy-Call Server Control Function") servers. For each client device connected to an IMS network, there is a P-CSCF server that serves as an entity connecting the core IMS network and the access network used by this client device; thus all the SIP signaling exchanged between the client device and the I-CSCF interrogation server or the S-CSCF registration server goes through the P-CSCF server.

The present invention relates to situations in which a certain transaction T2 is ordinarily expected following a first transaction T1. A "transaction" is defined as a set of messages exchanged between a given first communicating device and a given second communicating device, the first message of said set being of a given type. In many cases (but not in every case to which the invention applies), these transactions that are logically connected to one another share the same call reference (the same "Call-ID" in the SIP protocol).

Said message "types" can vary greatly, examples including a registration request (SIP "REGISTER" method), a subscription request (SIP "SUBSCRIBE" method), an event notification request (SIP "NOTIFY" method), a session establishment request (SIP "INVITE" method), a session establishment cancellation request (SIP "CANCEL" method), a session state modification request (SIP "UPDATE" method) and a session termination request (SIP "BYE" method).

Although standardized timeout mechanisms specific to a given transaction do exist, there is no control mechanism enabling a timeout to be applied to a set of transactions. However, this can prove to be very useful in various usage scenarios in order to prevent a malfunction, in which case it is for example possible to release unnecessary resources, repeat a request or trigger suitable supplementary actions.

The usefulness of such a control mechanism will now be illustrated on the basis of several examples.

According to a first example illustrated in FIG. 1, the message exchanges during a registration procedure will be considered.

In this example, the transaction T1 is represented by the exchanges F1/F2, and the transaction T2 by the exchanges F3/F4. In accordance with the SIP protocol, the transaction T2 should allow Bob to supply the result of the authentication computation using the data supplied by the SIP server in step F2.

However, once the transaction T1 has taken place, the SIP server waits for the transaction T2 for a certain amount of time but no longer; the SIP server does not, in fact, indefinitely retain the temporary data needed for authentication. There is therefore a maximum delay time for waiting for the transaction T2 after which the SIP server will not be able to take account of the request from step F3 because the temporary data will have been deleted. The transactions T1 and T2 are therefore connected by a multi-transactional timeout managed by the SIP server.

If Bob were aware of the maximum delay time for keeping temporary data in the SIP server, he would know once this timeout has elapsed that he must no longer send the request from step F3, but rather repeat step F1. If, however, Bob is unaware of this delay time and transmits the request from step F3 outside of the delay time, the SIP server will respond with an error message; conversely, if Bob, after a change in access type, initiates an entire registration procedure again by sending the request from step F1 while the server is waiting for the request from step F3, Bob runs the risk of this re-registration attempt being rejected; in both cases, side effects which may be curbed to a varying degree may ensue for Bob, such as an overall delay in registration, difficulties in the allocation of IPsec (Internet Protocol Security) or TLS (Transport Layer Security) resources, or even an endless loop.

Similar problems may arise in the case of a procedure for authentication with a mandatory server (SIP proxy), in which the messages from steps F1 and F3 are INVITE requests, and the response from step F2 is an authentication request 407. Likewise, the SIP proxy temporarily retains the data supplied in the response from step F2; after a certain delay time, the request from step F3 will be rejected by the SIP proxy.

Figure 2:
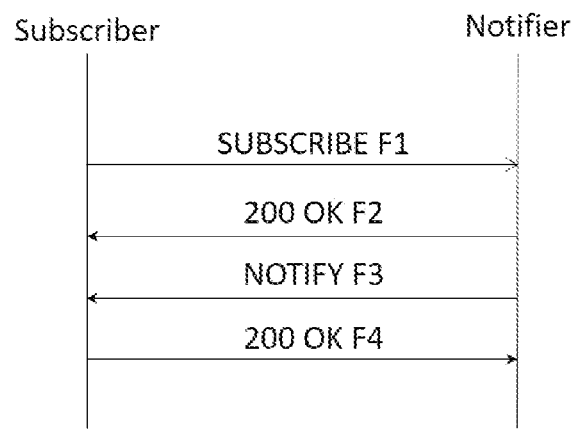

According to a second example illustrated in FIG. 2, what is considered is the message exchanges during a subscription procedure.

In this example, the transaction T1 (F1/F2, where F1 is a step of sending a SUBSCRIBE request) gives rise to a transaction T2 (F3/F4), which gives the current state of the subscription. If, after a certain delay time, the notification from step F3 does not reach the subscriber, this means that there has certainly been an incident; it is then necessary to be able to repeat the attempt by releasing the transaction T1 and initiating a new SUBSCRIBE request. Now, this delay time indication could be supplied by the notifier in the response from step F2.

Figure 3:
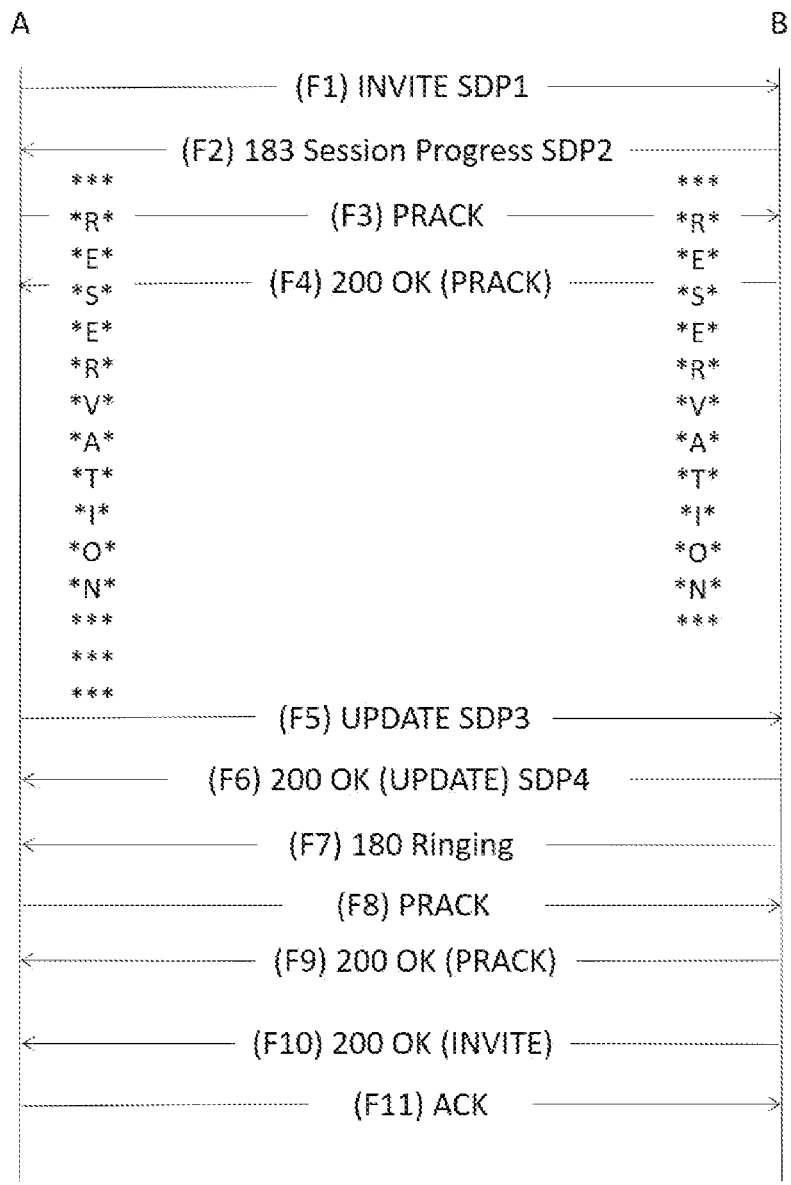

According to a third example illustrated in FIG. 3, what is considered is a sequence of preconditions according to the document RFC 3312 (these preconditions require a participant in a communication to implement one of the standardized resource reservation mechanisms before beginning a session). The SIP agents denoted A and B in this figure may each be a terminal or a server.

In this sequence, several transactions are dependent:
the transaction T1 is represented by the messages F1, F2, F7 and F10,
the transaction T2 (F3/F4) is triggered by the receipt of F2,
the transaction T3 (F5/F6) is triggered by the receipt of F2 and the successful reservation of network resources.

It will be recalled that according to the SIP standards, a PRACK message is a receipt acknowledgement sent in response to a provisional response. This is the case here for the messages F3, F4, F8 and F9.

The absence of the transaction T2 or T3 equates to a failure to reserve resources, and therefore a failure of the call. Now, in the current standards, there is no timeout to indicate to B, for example, a maximum delay time for waiting for step F5, after which delay time B has reason to abandon the procedure and release resources. For example, in the case of the use of this procedure for a Voice over IP call, the receipt by A of this error signaled by B could allow A to immediately switch the communication over to the circuit domain.

Figure 4:
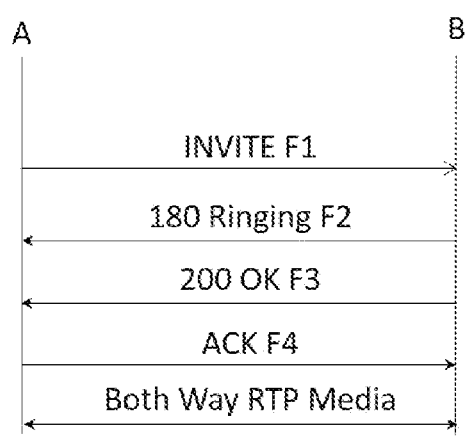

According to a fourth example illustrated in FIG. 4, what is considered is the establishment of a multimedia communication between two SIP agents A and B using the Real-Time Transport Protocol (RTP) (which enables the transport of data that are subject to real-time constraints, such as video or audio media streams).

The sequence illustrated in FIG. 4 is the conventional sequence for establishing such a communication. It may be desirable for the network not to indefinitely keep resources available for this communication. If the agent B could indicate a maximum dialog time in the response "200 OK" from step F3, the agent A could end the session with a BYE in order to release resources. This situation is liable to arise, for example, if the procedure for the network to release resources fails (due to a context loss, for example).

Figure 5:
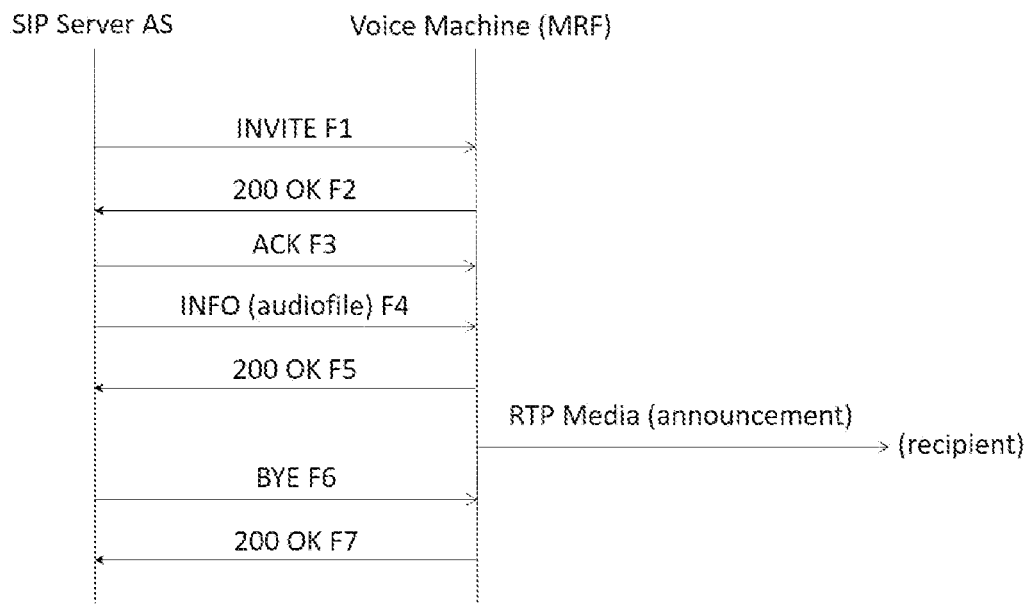

According to a fifth example illustrated in FIG. 5, what is considered is a voice announcement service.

The sequence illustrated in FIG. 5 is the conventional sequence during which an SIP server (for example an "Application Server"-type SIP server, denoted AS in the figure) orders a specialized equipment ("Media Resource Function", denoted MRF in the figure) to deliver a voice announcement to a third-party client (not shown). In this usage scenario, it is generally desirable to limit the delivery time of the announcement. The transactions initiated in steps F1 (INVITE) and F6 (BYE) are then connected by this maximum delivery delay time.

Generally, is it the SIP server that controls this timeout in relation to the state of the session with the third-party client. However, it may be advantageous to deliver the timeout value to the voice machine in the INVITE request (F1). Thus, if for any reason (for example the server restarting or a network failure) the BYE from step F6 is not received by the voice machine, the latter can take the appropriate measures (releasing resources or sending a BYE on its own initiative).

Figure 6:
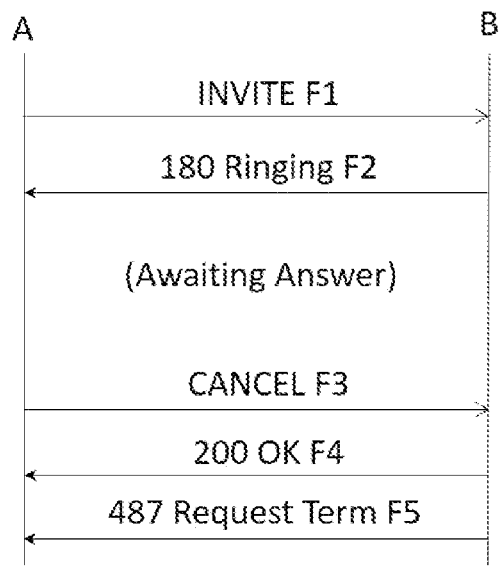

According to a sixth example illustrated in FIG. 6, what is considered is the activation of a no-answer forwarding service between two SIP agents A and B (where, for example, the agent A is the Telephony Application Server in charge of a terminal B).

Conventionally, the agent A manages a timeout which makes it possible to wait for the agent B to potentially go off-hook before carrying out forwarding to a new destination.

Normally, it is the agent A that sends the CANCEL request (step F3) triggering the end of the ringing once the waiting time has elapsed. However, it may be advantageous to deliver the timeout value to the agent B in the INVITE request (step F1). Thus, if the call does not result in the agent B going off-hook and if, for any reason (for example the server restarting or a network failure) the CANCEL request (step F3) is not received by the agent B, the latter can take the appropriate measures (for example stopping the ringing or sending a negative response to the INVITE request).

Figure 7:
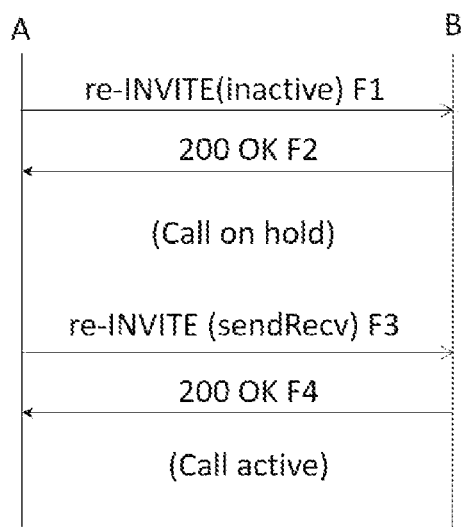

According to a seventh example illustrated in FIG. 7, what is considered is a communication between two SIP agents A and B, and a sequence for putting the communication on hold.

When a call is put on hold, it is desirable for the hold time to be limited. In this case, the transactions initiated in steps F1 and F3 are connected.

It may be advantageous to deliver the timeout value to the agent B that has been put on hold during the re-INVITE in step F1. Thus, if the dialog is not released and the call is not retrieved by the end of a certain delay time, that is to say if there is no re-INVITE as per step F3 (and no BYE), the agent B can take the appropriate measures (for example sending a BYE or releasing the resources).

The present invention therefore relates, according to a first aspect, to a control method relating to a communication between two devices, wherein the protocol of said communication comprises at least one transaction, known as the first transaction, and at least one subsequent transaction, known as the second transaction. Said method comprises the following steps:
- during said first transaction one of said devices, known as the first device, transmits to the other device, known as the second device, a maximum acceptable delay time between the end of the first transaction and the start of said second transaction, and also an explicit indication of the type of message characterizing said start of the second transaction, and
- said second device triggers a timer for said delay time.

It should be noted that (as illustrated in the examples above), during normal operation, depending on the application envisaged:

the message characterizing the start of the first transaction and the message characterizing the start of the second transaction may be of the same type or of different types, and it will be assumed that the message characterizing the start of the second transaction is sent either by said first device or by said second device.

By virtue of these provisions, if, for whatever reason, the message characterizing the start of the second transaction is not transmitted within said delay time, the second device may, if necessary, apply appropriate processing without waiting. This processing to be applied by the second device once the delay time has elapsed may vary greatly depending on the context of use. It may, for example, involve sending a new initial registration or subscription request, or stopping a voice announcement, or stopping ringing, or releasing resources involved in the communication.

It should be noted that the invention provides for transmitting, for each application of the invention, an explicit indication of the type of message characterizing the start of the second transaction as well as a timeout time. The invention also advantageously proposes a generic mechanism making it possible to obviate the need for establishing an international standard (on the basis of which an implicit indication of the type of message characterizing the start of the second transaction could suffice) for each application envisaged.

According to some specific features, when said communication is associated with at least one dialog, said second device no longer takes account of said delay time if said first device releases said dialog (for example by means of a BYE or CANCEL request in the case of a dialog initiated by an INVITE request) before this delay time has elapsed.

It will be recalled in this regard that a communication between a first and a second device is generally associated with several dialogs, for example a first dialog between the first device and a P-CSCF server of the originating network, a second dialog between this P-CSCF server of the originating network and an Application Server of the originating network, a third dialog between this Application Server of the originating network and an Application Server of the destination network, a fourth dialog between this Application Server of the destination network and a P-CSCF server of the destination network, and finally a fifth dialog between this P-CSCF server of the destination network and the second device.

By virtue of these provisions, said processing will automatically be canceled. It is thus possible to avoid a situation in which the second device takes an action that is unnecessary, or even inconsistent with releasing said dialog.

According to other specific features, said first device and said second device comprise SIP agents, and said type of message characterizing the start of the second transaction is an SIP method.

These provisions make it possible to benefit from the advantages of an advanced session control protocol.

According to a second aspect, the invention relates to various devices.

It also relates, firstly, to a communicating device, known as the first device, comprising means for, when said device is in communication with another communicating device, known as the second device, the protocol of said communication comprising at least one transaction, known as the first transaction, and at least one subsequent transaction, known as the second transaction, transmitting to said second device during said first transaction a maximum acceptable delay time between the end of the first transaction and the start of said second transaction, and also an explicit indication of the type of message characterizing said start of the second transaction.

The invention also relates, secondly, to a communicating device, known as the second device, comprising means for, when said device is in communication with another communicating device, known as the first device, the protocol of said communication comprising at least one transaction, known as the first transaction, and at least one subsequent transaction, known as the second transaction:

receiving from said first device, during said first transaction, a maximum acceptable delay time between the end of the first transaction and the start of said second transaction, and also an explicit indication of the type of message characterizing said start of the second transaction, and triggering a timer for said delay time.

According to specific features, said second device comprises means for, when said communication is associated with at least one dialog, no longer taking account of said delay time if said first device releases said dialog before this delay time has elapsed.

According to other specific features, said first device or said second device comprises an SIP agent, and said message type is an SIP method.

According to yet other specific features, said first device or said second device is accommodated in a client device or in a server.

It goes without saying that the same client device or the same server can accommodate both a first device and a second device, such as are succinctly described above.

The advantages offered by these devices are essentially the same as those offered by the correlative methods succinctly set forth above.

It should be noted that it is possible to embody these devices in the context of software instructions and/or in the context of electronic circuits.

According to a third aspect, the invention relates to a communication system comprising at least one first device and at least one second device, such as are succinctly described above.

Another subject of the invention is a computer program that can be downloaded from a communication network and/or is stored on a computer-readable medium and/or can be executed by a microprocessor. This computer program is noteworthy in that it comprises instructions for executing the steps, implemented by the first device, of the control method that is succinctly set forth above when these steps are executed on a computer, or for executing the steps, implemented by the second device, of the control method that is succinctly set forth above when these steps are executed on a computer.

The advantages offered by this computer program are essentially the same as those offered by said method.

Figure 8:
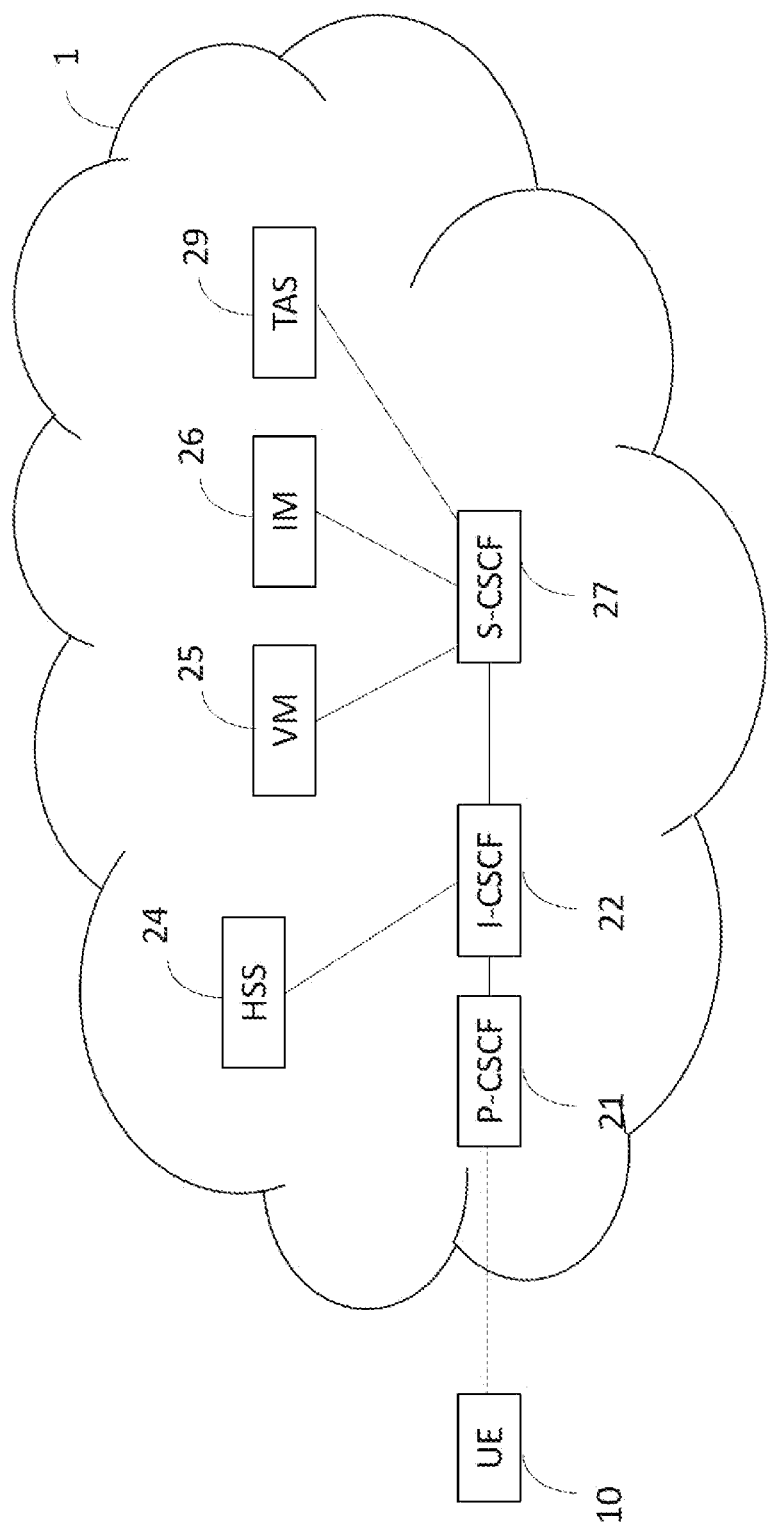

Other aspects and advantages of the invention will become apparent on reading the detailed description below of particular embodiments, which are given by way of nonlimiting examples. The description makes reference to the figures accompanying it, in which:

FIG. 1 depicts a registration procedure,
FIG. 2 depicts a subscription procedure,
FIG. 3 depicts resource reservation,
FIG. 4 depicts the establishment of a multimedia communication using the RTP protocol,
FIG. 5 depicts the activation of a voice announcement service,
FIG. 6 depicts the activation of a no-answer forwarding service,
FIG. 7 depicts the activation of the holding of a call, and
FIG. 8 schematically depicts a system for providing multimedia services which is suitable for implementing the invention.

Although the present invention relates to IP networks in general, what will now be considered, as an exemplary embodiment, is an IMS network architecture, such as is succinctly presented above. This architecture is illustrated in FIG. 8.

The multimedia services offered by this IMS network 1 may comprise telephony, videotelephony, content sharing, Presence, Instant Messaging, or television services. These services are available to the user of a client device ("User Equipment", or UE) 10 belonging to the network 1, which allows the client device 10 to exchange multimedia streams and session control signals in accordance with the SIP protocol with, for example, the client device (not shown) of a user belonging to an SIP network (not shown) connected to the network 1.

The client device 10 may be a fixed or mobile terminal, or a residential or business gateway having SIP signaling means and possibly comprising means for rendering audio-visual content.

As shown in FIG. 8, this IMS network 1 comprises, as well as an IP transport infrastructure (not shown):

- at least one S-CSCF server; the S-CSCF server 27 manages in particular the procedure for registering the devices connected to the network 1; the S-CSCF server 27 also manages the routing of the signaling between the client device 10 and the voicemail VM server 25, Instant Messaging server 26, and telephony server TAS 29;
- at least one I-CSCF server; the I-CSCF server 22 manages in particular the routing toward other terminals managed by the same IMS network 1 and the routing of the signaling between this IMS network 1 and other networks (not shown);
- at least one P-CSCF server; the P-CSCF server 21 serves as an entity connecting the core IMS network and the access network used by the client device 10;
- at least one HSS-type database server; the HSS server 24 contains the profile of the user of the client device 10 in terms of authentication and location data, and services subscribed to;
- at least one voicemail ("message-summary") VM server 25; the VM server 25 manages the subscription of the client device 10 to events relating to messages for the client device 10 being left/listened to, and notifies the client device 10 when these events occur;
- at least one Instant Messaging IM server 26; if the user of the UE 10 has a subscription to the Instant Messaging service, this user can "instantly" chat online with other subscribers to this service; and
- at least one telephony server TAS 29; the TAS server manages the telephony services which the user of the terminal 10 has subscribed to with his or her operator, such as number displaying or call forwarding.

The voicemail VM server 25, Instant Messaging IM server 26, and telephony server TAS 29 are examples of Application Servers (AS).

Some services, such as those of the VM server 25 and the Instant Messaging IM server 26, rely on the subscription of the terminal 10 to predetermined events, as explained above.

The present invention relates to a communication between two devices, wherein the protocol of said communication comprises at least one transaction, known as the first transaction, and at least one subsequent transaction, known as the second transaction.

According to one embodiment of the invention, the following steps are implemented:

during said first transaction one of said devices, known as the first device, transmits to the other device, known as the second device, a maximum acceptable delay time between the end of the first transaction and the start of said second transaction, and also an explicit indication of the type of message characterizing said start of the second transaction, and said second device triggers a timer for said delay time.

According to a specific application, the "first device" and the "second device" comprise SIP agents. In this case, according to a variant, the first device may conveniently use a new SIP header that indicates the maximum time for waiting for a new transaction for the same call reference (Call-ID). This header could for example take the following form:

Next-Transaction-Limit: method; delay

Here, the "method" parameter indicates the SIP method characterizing the start of the upcoming transaction, and the "delay" parameter indicates the timeout time.

Thus, in the first example, the SIP server can introduce the following information in step F2:

Next-Transaction-Limit: REGISTER; 60 to indicate to Bob that the temporary authentication data are valid only for the next 60 seconds. After that, Bob will have to re-send an initial registration request. Likewise, in the case of mobility between two access networks, Bob's terminal will be aware that it can send the initial REGISTER on the new access only after waiting 60 seconds.

In the second example, the notifier can introduce the following information in step F2:

Next-Transaction-Limit: NOTIFY; 140 to indicate to the subscriber that if no notification is received (step F3) within a delay time of 140 seconds, the current subscription will have to be canceled and renewed.

In the third example, the SIP agent A can introduce the following information in step F3:

Next-Transaction-Limit: UPDATE; 10 in the PRACK message from step F3, in order to indicate to the SIP agent B that if the latter does not receive an UPDATE request (step F5) within 10 seconds following the receipt of the PRACK message, the agent B will have to release the resources using an appropriate code (thus allowing the SIP agent A to transfer the communication to the circuit domain). This behavior could likewise be employed to restrict the delay time for receiving the PRACK message in steps F3 and F8.

In the fourth example, the agent B can introduce the following information in step F3:

Next-Transaction-Limit: BYE; 43200 in order to indicate to the agent A that if the dialog has not been released after 12 h, the agent A will have to release the resource using an appropriate code. In the same example, the agent A can supply the same information to the agent B in step F4.

In the fifth example, the SIP server can introduce the following information in step F4:

Next-Transaction-Limit: BYE; 300 in order to indicate to the voice machine that the announcement has to be delivered at most for 5 minutes.

In the sixth example, the agent A can introduce the following information in step F1:

Next-Transaction-Limit: CANCEL; 30 in order to indicate to the agent B that the waiting time for the CANCEL request is 30 seconds at most.

In the seventh example, the agent A can introduce the following information in step F1:

Next-Transaction-Limit: INVITE; 300 in order to indicate to the agent B that the hold time is 5 minutes at most.

It should be noted that, in the examples described above, the timeout information has been conveyed in a dedicated header. However, other formats are obviously possible for conveying this information. Thus, as a variant, this information can be conveyed in the message body ("body xml") of a request and/or of the response to a request.

Generally, the present invention can be implemented within the nodes of an IP network, for example within the client devices or servers, using software and/or hardware components.

The software components may be integrated into a conventional computer program for network node management. It is for this reason, as indicated above, that the present invention also relates to a computing system. This computing system includes, as is conventional, a central processing unit using signals to control a memory, and also an input unit and an output unit. Moreover, this computing system can be used to execute a computer program including instructions for implementing steps of any one of the control methods according to the invention.

Indeed, another subject of the invention is a computer program that can be downloaded from a communication network and comprises instructions for executing steps of a control method according to the invention when it is executed on a computer. This computer program may be stored on a computer-readable medium and may be able to be executed by a microprocessor.

This program may use any programming language and take the form of source code, object code, or intermediate code between source code and object code, e.g. it may be in a partially compiled form or in any other desirable form.

Another subject of the invention is an irremovable, or partially or fully removable computer-readable information medium including instructions of a computer program such as is mentioned above.

The information medium may be any entity or device capable of storing the program. For example, the medium may comprise a storage means, such as a ROM, for example a CD ROM or a microelectronic circuit ROM, or a magnetic recording means, such as a hard disk, or else a USB stick ("USB flash drive").

Moreover, the information medium may be a transmissible medium such as an electrical or optical signal, which may be routed via an electrical or optical cable, by radio or by other means. The computer program according to the invention may in particular be downloaded to an Internet network.

As a variant, the information medium may be an integrated circuit in which the program is incorporated, the circuit being designed to execute steps or to be used in the execution of steps of any one of the control methods according to the invention.

The invention claimed is:

1. A method of controlling a communication between a first device and a second device, a protocol of the communication comprising at least a first transaction and a second transaction subsequent to the first transaction, the method comprising:

during the first transaction, transmitting from the first device to the second device a maximum acceptable delay time between the end of the first transaction and the start of the second transaction, and an explicit indication of the type of message characterizing the start of the second transaction, and triggering, by the second device, a timer for the delay time, wherein during the first transaction, the maximum acceptable delay time between the end of the first transaction and the start of the second transaction and the explicit indication of the type of message characterizing the start of the second transaction are transmitted from the first device to the second device in a single message.

2. The method as claimed in claim 1, wherein when the communication is associated with at least one dialog, the second device no longer takes account of the delay time if the first device releases the dialog before the delay time has elapsed.

3. The method as claimed in claim 1, wherein the first device and the second device comprise SIP (Session Initiation Protocol) agents, and wherein the type of message characterizing the start of the second transaction is an SIP method.

4. A communication device comprising electronic circuitry, the communication device configured to, when the device is in communication with a second communication device, a protocol of the communication comprising at least a first transaction and a second transaction subsequent to the first transaction, transmit to the second device during the first transaction:
   a maximum acceptable delay time between the end of the first transaction and the start of the second transaction, and
   an explicit indication of the type of message characterizing the start of the second transaction,
   wherein during the first transaction, the maximum acceptable delay time between the end of the first transaction and the start of the second transaction and the explicit indication of the type of message characterizing the start of the second transaction are transmitted from the first device to the second device in a single message.

5. A communication device comprising electronic circuitry, the communication device configured to, when the device is in communication with another communication device, a protocol of the communication comprising at least a first transaction and a second transaction subsequent to the first transaction:
   receive from the first device, during the first transaction:
      a maximum acceptable delay time between the end of the first transaction and the start of the second transaction, and
      an explicit indication of the type of message characterizing the start of the second transaction, and
   trigger a timer for said delay time,
   wherein during the first transaction, the maximum acceptable delay time between the end of the first transaction and the start of the second transaction and the explicit indication of the type of message characterizing the start of the second transaction are transmitted from the first device to the second device in a single message.

6. The communication device as claimed in claim 5, the communication device further configured to, when the communication is associated with at least one dialog, no longer take account of the delay time if the first device releases the dialog before the delay time has elapsed.

7. The communication device as claimed in claim 4, wherein the communication device comprises an SIP (Session Initiation Protocol) agent, and wherein the message type is an SIP method.

8. The communication device as claimed in claim 4, wherein the communication device is accommodated in a client device.

9. The communication device as claimed in claim 4, wherein the communication device is accommodated in a server.

10. A communication system comprising:
    a communication device as claimed in claim 4 and another communication device, both comprising electronic circuitry, the other communication device configured to:
    receive from the first device, during the first transaction:
       the maximum acceptable delay time between the end of the first transaction and the start of the second transaction, and
       the explicit indication of the type of message characterizing the start of the second transaction, and
    trigger a timer for the delay time
    wherein during the first transaction, the maximum acceptable delay time between the end of the first transaction and the start of the second transaction and the explicit indication of the type of message characterizing the start of the second transaction are transmitted from the first device to the second device in a single message.

11. A non-transitory computer-readable storage having stored thereon instructions which, when executed by a processor, cause the processor to implement the method as claimed in claim 1.

12. A computer comprising a processor and a memory, the memory having stored thereon instructions which, when executed by the processor, cause the computer to implement the method as claimed in claim 1.

* * * * *